US006916033B2

(12) United States Patent
Yih

(10) Patent No.: US 6,916,033 B2
(45) Date of Patent: Jul. 12, 2005

(54) FRONT FORK UNIT WITH A SHOCK ABSORBER AND A RESISTANCE-PROVIDING MEMBER FOR A BICYCLE

(75) Inventor: Johnson Yih, Taichung Hsien (TW)

(73) Assignee: Giant Manufacturing Co., Ltd., Taichung Hsien (TW)

( * ) Notice: Subject to any disclaimer, the term of this patent is extended or adjusted under 35 U.S.C. 154(b) by 0 days.

(21) Appl. No.: 10/720,120

(22) Filed: Nov. 25, 2003

(65) Prior Publication Data

US 2005/0110237 A1 May 26, 2005

(51) Int. Cl.[7] .................................................. B62K 1/00
(52) U.S. Cl. ...................................... 280/276; 280/279
(58) Field of Search ................................ 280/276, 279, 280/280, 283, 275; 74/551.1, 551.2

(56) References Cited

U.S. PATENT DOCUMENTS

| 1,188,168 | A | * | 6/1916 | Genovese | 280/276 |
| 5,308,099 | A | * | 5/1994 | Browning | 280/276 |
| 5,380,026 | A | * | 1/1995 | Robinson | 280/276 |
| 5,509,676 | A | * | 4/1996 | Fukutake et al. | 280/276 |
| 5,857,689 | A | * | 1/1999 | Chien | 280/276 |
| 5,947,498 | A | * | 9/1999 | Rajaee | 280/276 |

* cited by examiner

Primary Examiner—Daniel G. DePumpo
(74) Attorney, Agent, or Firm—Harness, Dickey & Pierce, P.L.C.

(57) ABSTRACT

A front fork unit of a bicycle includes a fork body, an outer tube movable relative to the fork body, a shock absorber interposed between and secured to the fork body and the outer tube, an inner tube disposed in the outer tube and secured to the fork body, and a resistance-providing member secured to one of the inner and outer tubes and in sliding and frictional contact with the other of the inner and outer tubes so as to provide a resistance to movement of the outer tube relative to the fork body.

3 Claims, 6 Drawing Sheets

FRONT FORK UNIT WITH A SHOCK ABSORBER AND A RESISTANCE-PROVIDING MEMBER FOR A BICYCLE

BACKGROUND OF THE INVENTION

1. Field of the Invention

This invention relates to a front fork unit for a bicycle, more particularly to a front fork unit with a shock absorber and a resistance-providing member for a bicycle.

2. Description of the Related Art

The front fork unit of a bicycle is provided with a shock absorber for absorbing shock resulting from a rough surface during riding of the bicycle. The conventional shock absorbers are normally spring-type shock absorbers, which are disadvantageous in that the rate of each compression stroke or each restoring stroke thereof is relatively fast, which undesirably resulting in poor cushioning effect and discomfort when riding. While hydraulic-type shock absorbers can provide a better cushioning effect, hydraulic oil leakage is likely to occur during use.

SUMMARY OF THE INVENTION

Therefore, the object of the present invention is to provide a front fork unit with a shock absorber and a resistance-providing member that is capable of overcoming the aforesaid drawbacks of the prior art.

According to the present invention, there is provided a front fork unit of a bicycle that includes: a fork body; an outer tube disposed above and movable relative to the fork body in a longitudinal direction; a shock absorber interposed between and secured to the fork body and the outer tube so as to provide a shock absorbing effect to the front fork unit during movement of the outer tube relative to the fork body in the longitudinal direction; an inner tube disposed in the outer tube and secured to the fork body; and a resistance-providing member secured to one of the inner and outer tubes and in sliding and frictional contact with the other of the inner and outer tubes so as to provide a resistance to movement of the outer tube relative to the fork body in the longitudinal direction.

BRIEF DESCRIPTION OF THE DRAWINGS

In drawings which illustrate an embodiment of the invention.

DETAILED DESCRIPTION OF THE PREFERRED EMBODIMENT

Figure 1:
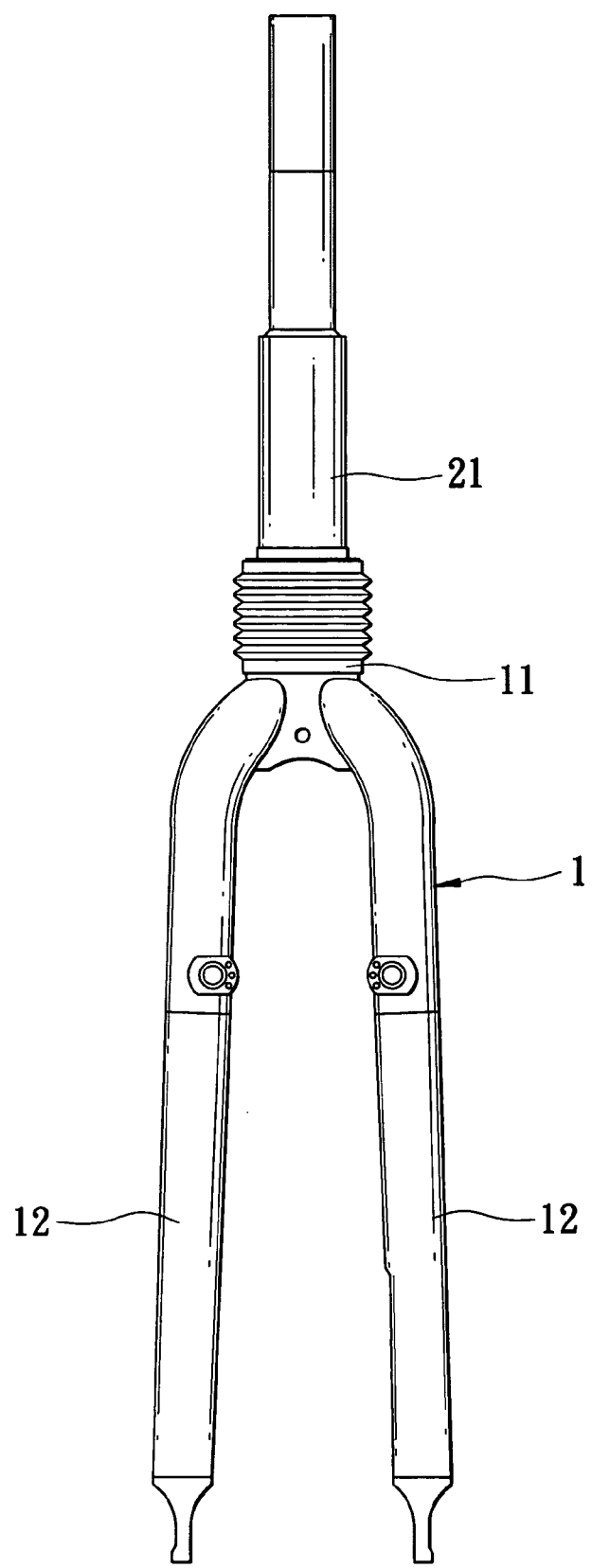
FIG. 1 is a front view of the preferred embodiment of a front fork unit for a bicycle according to the present invention.
Figure 2:
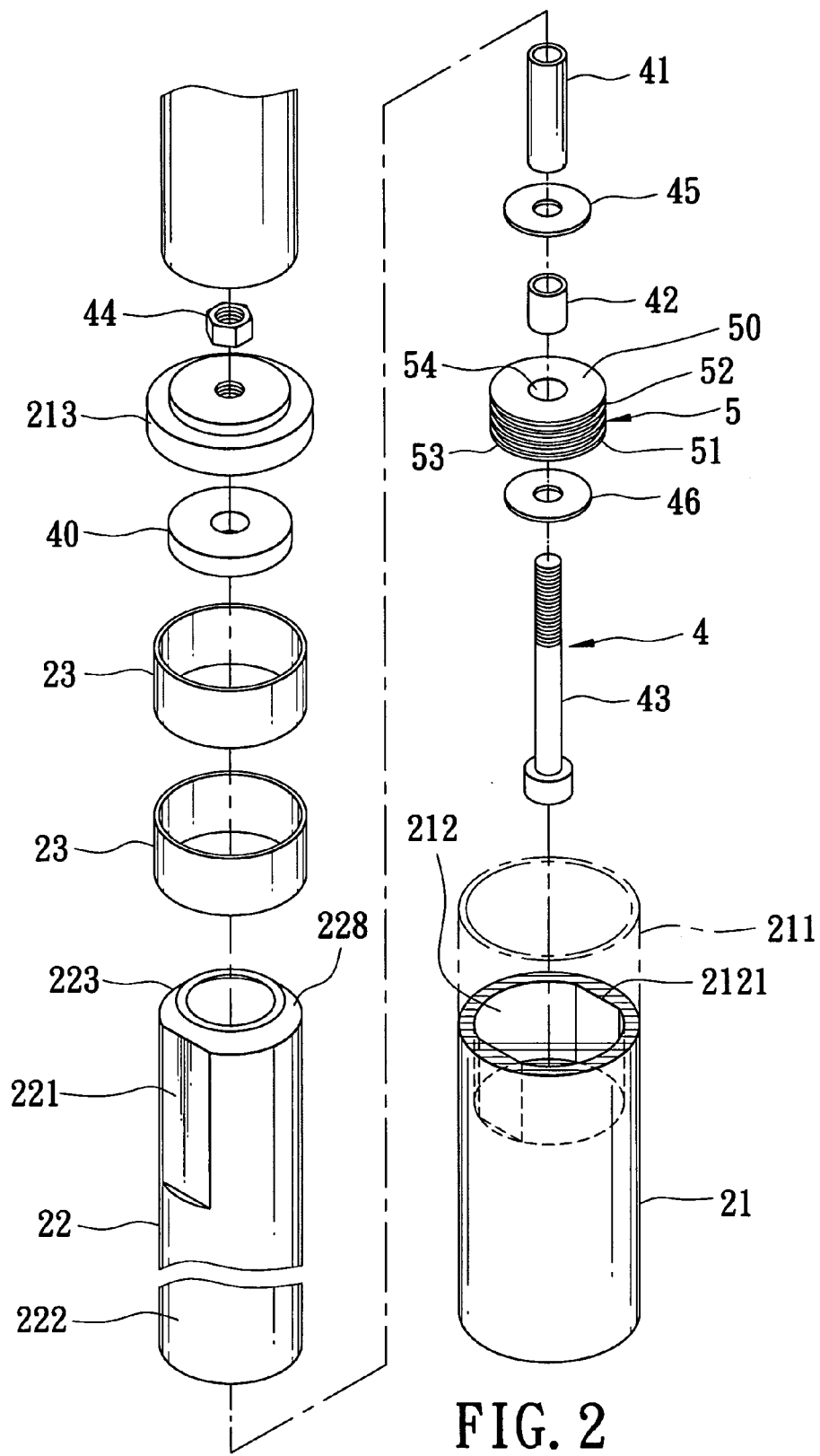
FIG. 2 is a fragmentary exploded perspective view of the front fork unit of FIG. 1.
Figure 3:
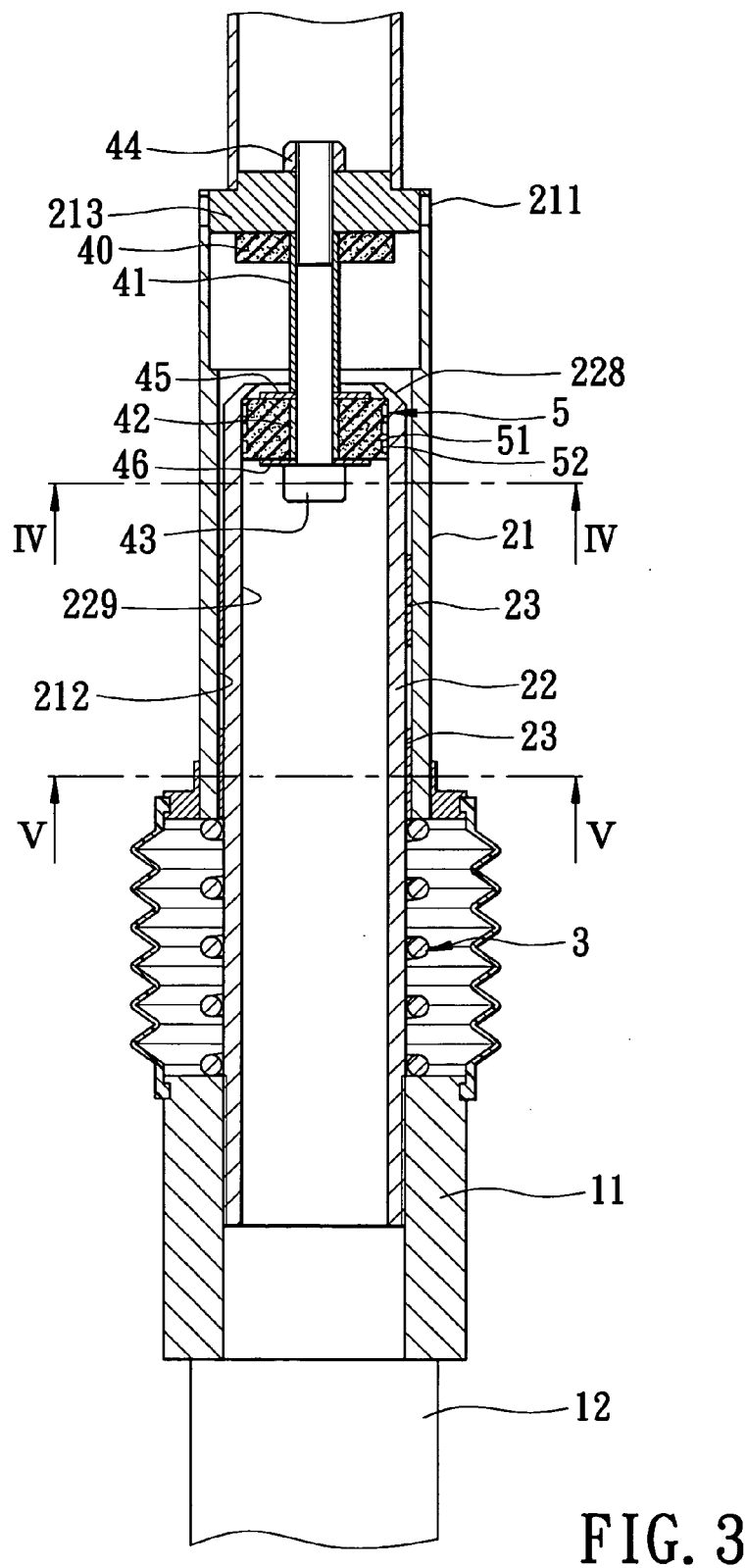
FIG. 3 is a fragmentary sectional view of the front fork unit of FIG. 1.
Figure 4:
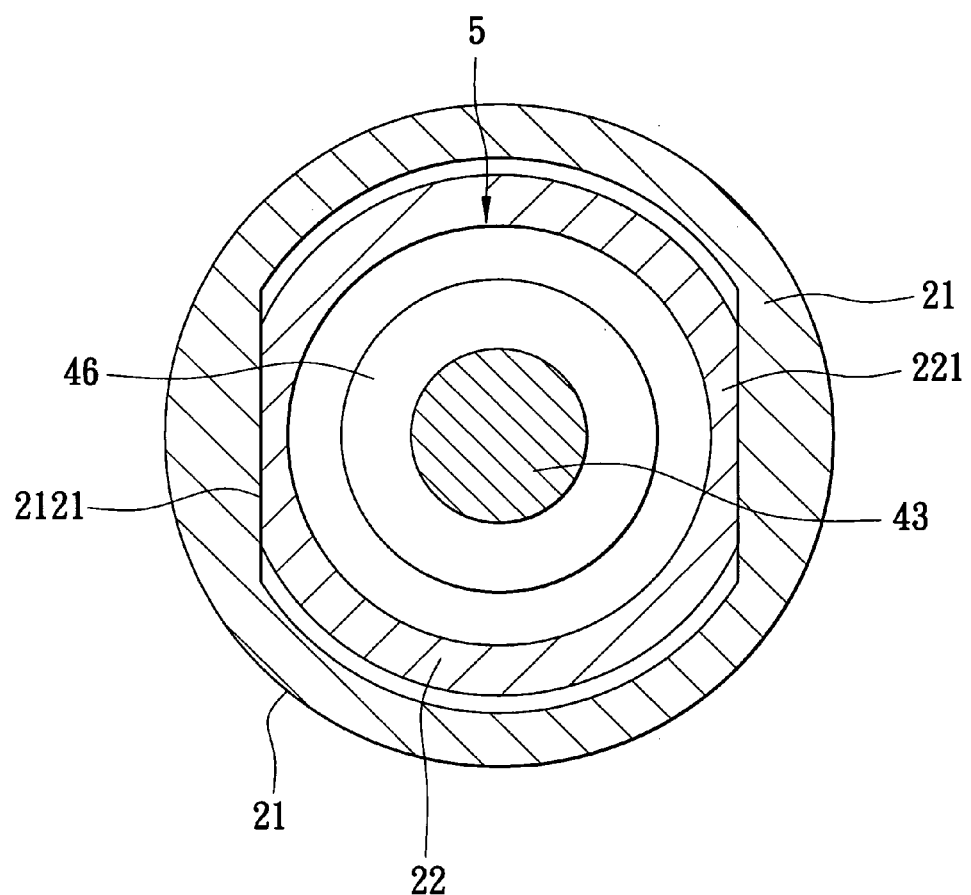
FIG. 4 is a sectional view taken from lines IV—IV in FIG. 3.
Figure 5:
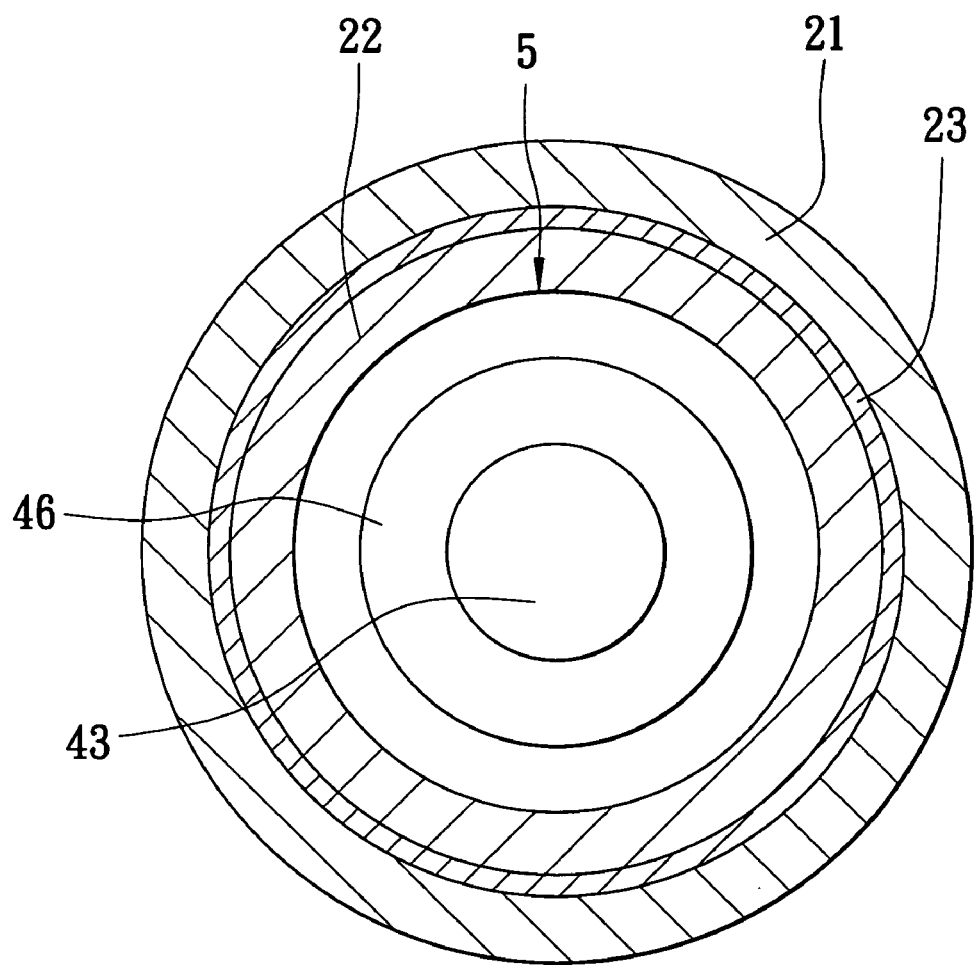
FIG. 5 is a sectional view taken from lines V—V in FIG. 3.

FIGS. 1 to 5 illustrate the preferred embodiment of a front fork unit for a bicycle according to the present invention. The front fork unit includes: a fork body 1 with a pair of prongs 12 and a connecting tube 11 connected to the prongs 12; an outer tube 21 disposed above and movable relative to the fork body 1 in a longitudinal direction; a shock absorber 3 (see FIG. 3) interposed between and secured to the connecting tube 11 of the fork body 1 and the outer tube 21 so as to provide a shock absorbing effect to the front fork unit during movement of the outer tube 21 relative to the fork body 1 in the longitudinal direction; an inner tube 22 disposed in the outer tube 21 and extending into and secured to the connecting tube 11 of the fork body 1; a pair of sleeves 23 that are disposed between and that are in sliding contact with the outer and inner tubes 21, 22; and a resistance-providing member 5 secured to one of the inner and outer tubes 22, 21 and in sliding and frictional contact with the other of the inner and outer tubes 22, 21 so as to provide a resistance to movement of the outer tube 21 relative to the fork body 1 in the longitudinal direction. In this embodiment, the resistance-providing member 5 is secured to the outer tube 21 through a fastening member 4.

Referring back to FIGS. 2 and 3, the inner tube 22 has an inner tube surface 229 and a top end 223 formed with a top inner flange 228 extending inwardly and radially therefrom. The resistance-providing member 5 is disposed in the inner tube 22, is in sliding and frictional contact with the inner tube surface 229 of the inner tube 22, and abuts against the top inner flange 228 of the inner tube 22 when the outer tube 21 is moved to a highest position (see FIG. 3) relative to the fork body 1.

The outer tube 21 has a top end 211. The resistance-providing member 5 is annular in shape, has top and bottom end faces 50, 53, and defines a through-hole 54 extending from the top end face 50 to the bottom end face 53 of the resistance-providing member 5. The fastening member 4 includes a top inner block 213 secured to the top end 211 of the outer tube 21, upper and lower washers 45, 46 sandwiching the resistance-providing member 5 therebetween, a tubular upper spacer 41 extending between and abutting against the top inner block 213 and the upper washer 45, a tubular lower spacer 42 disposed in the through-hole 54 and abutting against the upper and lower washers 45, 46, a screw bolt 43 extending through the lower washer 46, the lower and upper spacers 41, 42, and the top inner block 213, and a screw nut 44 engaging threadedly the screw bolt 43 so as to prevent undesired removal of the resistance-providing member 5 from the fastening member 4 and so as to prevent compression of the resistance-providing member 5 during movement of the outer tube 21 relative to the fork body 1.

Figure 6:
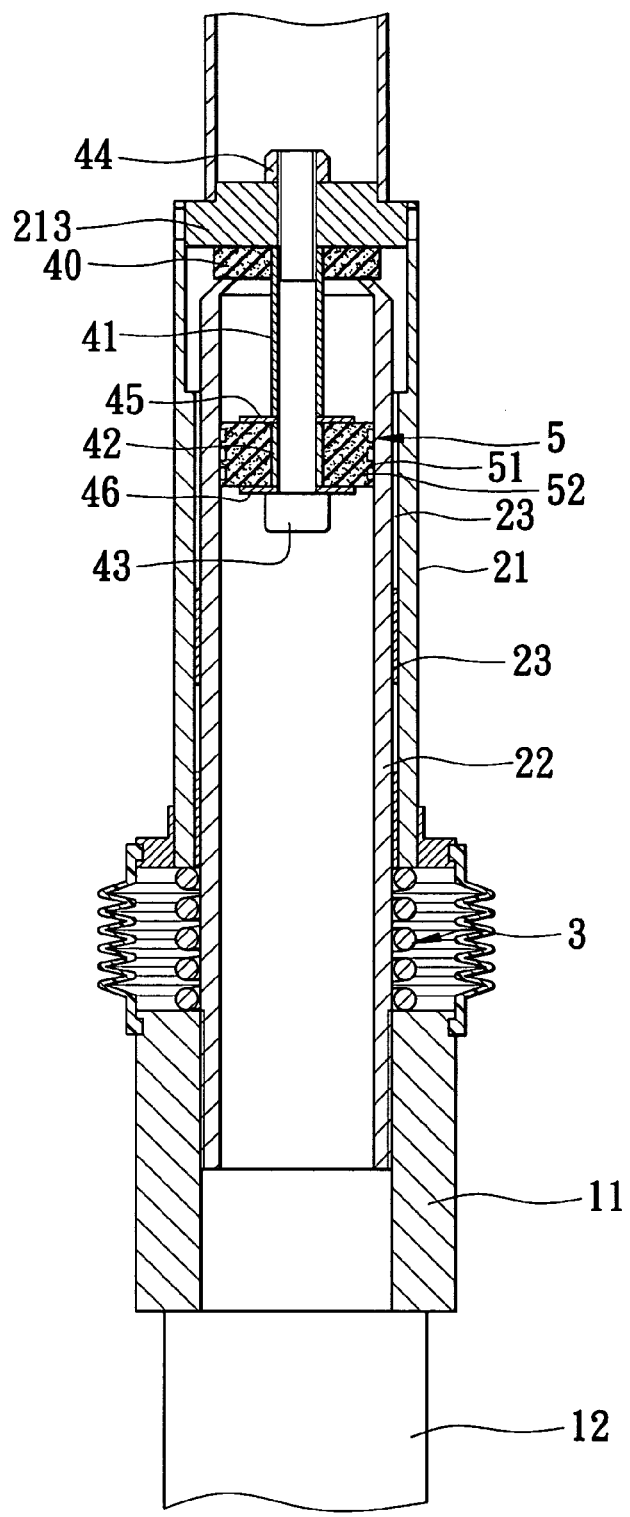
FIG. 6 is a fragmentary sectional view of the front fork unit of FIG. 1, with an outer tube disposed at a lowest position relative to a fork body of the front fork unit of FIG. 1.

The fastening member 4 further includes an elastic cushion 40 sleeved on the upper spacer 41 and abutting against the top inner block 213. The top inner flange 228 of the inner tube 22 abuts against the cushion 40 when the outer tube 21 is moved to a lowest position (see FIG. 6) that is lower than the highest position.

The resistance-providing member 5 has an annular outer surface formed with a plurality of alternately disposed annular grooves 52 and annular ribs 51. The ribs 51 are in sliding contact with the inner tube surface 229 of the inner tube 22 so as to permit smooth movement of the outer tube 21 relative to the fork body 1.

In this preferred embodiment, the shock absorber 3 includes a compression spring that is disposed between and that abuts against the outer tube 21 and the fork body 1.

The outer tube 21 has an inner surface 212 with a non-circular portion 2121 adjacent to the top end 211 of the outer tube 21. The inner tube 22 has an outer surface 222 with a non-circular portion 221 adjacent to the top end 223 of the inner tube 22. The non-circular portion 221 of the outer surface 222 of the inner tube 22 confronting the non-circular portion 2121 of the inner surface 212 of the outer tube 21 so as to prevent rotation of the inner tube 22 relative to the outer tube 21.

With the inclusion of the resistance-providing member 5 in the front fork unit of this invention, the rate of each compression stroke or each restoring stroke of the shock absorber 3, thereby eliminating the aforesaid drawback associated with the prior art.

With the invention thus explained, it is apparent that various modifications and variations can be made without departing from the spirit of the present invention.

I claim:

1. A front fork unit of a bicycle comprising:
   a fork body;
   an outer tube disposed above and movable relative to said fork body in a longitudinal direction;
   a shock absorber interposed between and secured to said fork body and said outer tube so as to provide a shock absorbing effect to said front fork unit during movement of said outer tube relative to said fork body in said longitudinal direction;
   an inner tube disposed in said outer tube and secured to said fork body;
   a fastening member including a top inner block secured to said top end of said outer tube, upper and lower washers sandwiching said resistance-providing member therebetween, a tubular upper spacer extending between and abutting against said top inner block and said upper washer, a tubular lower spacer disposed in said through-hole and abutting against said upper and lower washers, a screw bolt extending through said lower washer, said lower and upper spacers, and said top inner block, and a screw nut engaging threadedly said screw bolt so as to prevent undesired removal of said resistance-providing member from said fastening member;
   a resistance-providing member secured to one of said inner and outer tubes and in sliding and frictional contact with the other of said inner and outer tubes so as to provide a resistance to movement of said outer tube relative to said fork body in said longitudinal direction, said resistance-providing member being secured to said outer tube through said fastening member;
   wherein said inner tube has an inner tube surface and a top end formed with a top inner flange extending inwardly and radially therefrom, said resistance-providing member being disposed in said inner tube, being in sliding and frictional contact with said inner tube surface of said inner tube, and abutting against said top inner flange of said inner tube when said outer tube is moved to a highest position relative to said fork body; and
   wherein said outer tube has a top end, said resistance-providing member being annular in shape, having top and bottom end faces, and defining a through-hole extending from said top end face to said bottom end face of said resistance-providing member.

2. The front fork unit of claim 1, wherein said fastening member further includes an elastic cushion sleeved on said upper spacer and abutting against said top inner block, said top inner flange of said inner tube abutting against said cushion when said outer tube is moved to a lowest position lower than said highest position.

3. The front fork unit of claim 2, wherein said resistance-providing member has an annular outer surface formed with a plurality of alternately disposed annular grooves and annular ribs, said ribs being in sliding contact with said inner tube surface of said inner tube.

* * * * *